Jan. 9, 1962 R. A. COTE Re. 25,111

CAN CARTON WITH CHIME ENGAGING TABS

Original Filed Sept. 18, 1958 2 Sheets-Sheet 1

INVENTOR
Raymond A. Cote
BY Clarence H. Seeley,
ATTORNEY

Jan. 9, 1962 R. A. COTE Re. 25,111

CAN CARTON WITH CHIME ENGAGING TABS

Original Filed Sept. 18, 1958 2 Sheets-Sheet 2

INVENTOR
Raymond A. Cote
BY Clarence R. Seeley
ATTORNEY

United States Patent Office

Re. 25,111
Reissued Jan. 9, 1962

25,111

CAN CARTON WITH CHIME ENGAGING TABS

Raymond A. Cote, Monroe, La., assignor to Container Corporation of America, Chicago, Ill., a corporation of Delaware Original No. 2,963,148, dated Dec. 6, 1960, Ser. No. 761,874, Sept. 18, 1958. Application for reissue July 10, 1961, Ser. No. 126,797
6 Claims. (Cl. 206—65)

Matter enclosed in heavy brackets [ ] appears in the original patent but forms no part of this reissue specification; matter printed in italics indicates the additions made by reissue.

The present invention relates to paperboard cartons and more particularly to cartons of the open end type adapted for the retention of two rows of chimed cans.

An important object of the invention is to provide an efficient, inexpensive form of open end carton for two rows of chimed cans, such carton having substantially all the advantages of open end cartons with center partitions but being constructed with substantially less material.

A further object of the invention is to provide an open end, sleeve type carton for two rows of chimed cans held side-by-side, in which means are provided for holding the cans in accurate side-by-side relation wthout the tendency for the chimes of cans in one row to overlap or ride into the chimes in the other row.

A still further object of the invention is to form on one of the panels against which the can ends bear, a central abutment or contacting means which is adapted to engage edgewise on the chimes of the cans and hold them firmly against their adjacent panels thus assuring that the chimes at the opposite ends of the cans in adjacent rows will not ride one upon the other.

Other objects and advantages of the present invention will become apparent as the description proceeds.

The invention, as herein disclosed, is embodied in a one-piece carton formed from a strip of foldable paperboard joined to provide an open rectangular, collapsible sleeve. On one of the walls which contacts the can ends is formed a central, narrow, upstanding abutment or partition portion against which the can chimes may engage laterally. On this abutment or partition a pair of opposed, narrow strips project toward the adjacent can chimes and such strips are sufficiently narrower than the abutment or partition so that they may bear directly edgewise against the edges of the adjacent can chimes.

Figure 2:
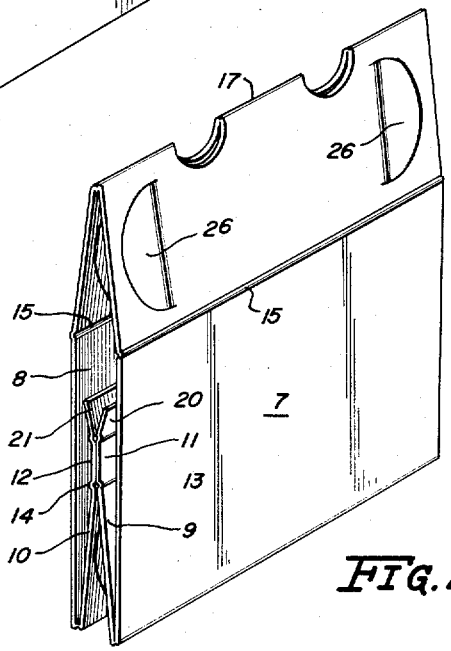
FIG. 2 is a perspective view showing the carton in substantially collapsed position.

Referring particularly to the drawings, the carton is indicated as a whole at 5, and comprises an end wall panel 6 which may for convenience be considered the top wall, two side wall panels 7 and 8, and a second end wall panel, for convenience termed the bottom wall, formed of two sections, 9 and 10. The sections are formed with narrow attached strips, 11 and 12, defined from sections 9 and 10 by crease or score lines 13 and 14. These strips are secured together as by means of adhesive to complete the bottom wall. The walls are hingedly related along separating crease lines indicated at 15, 15 and 16, 16 and the top wall 15 is creased centrally at 17, thus providing a collapsible construction, as illustrated in FIG. 2. According to this construction the two sections of the bottom wall will fold upwardly about the hinge provided by the crease lines 13 and 14 and the side walls 7 and 8 will move in to lie flat against the bottom sections 9 and 10. At the same time the two halves of the top panel 6 will be folded about the crease line 17, allowing the sections of the top panel to be folded one against the other.

Figure 1:
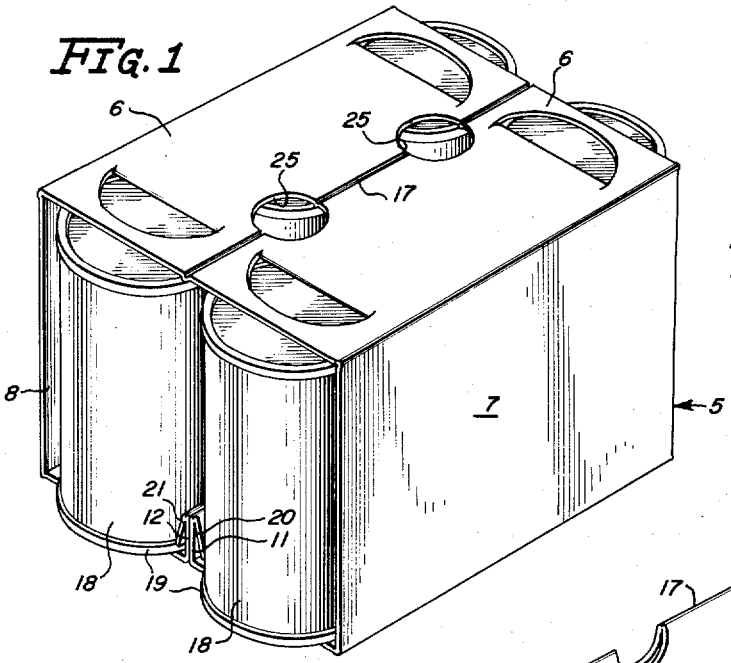
FIG. 1 is a perspective view of an open end can carton constructed in accordance with the present invention, showing chimed cans in place therein.
Figure 3:
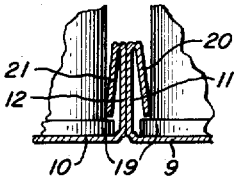
FIG. 3 is a fragmentary, cross-sectional detail view showing the means for engaging edgewise against the can chimes to retain the can ends flat against their adjacent wall panels.
Figure 4:
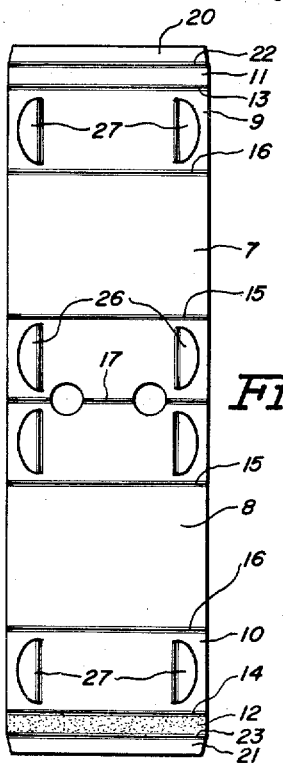
FIG. 4 is a plan view of a preferred form of blank from which the carton of the present invention may be formed.

When the carton is brought to fully expanded condition two rows of cans indicated at 18, 18 may be loaded into the carton by sliding them endwise thereinto. In order to assure accurate positioning of the cans there is provided on the narrow strips 11 and 12 a means for engaging downwardly against the upper surfaces of the can chimes to retain the can ends in close relation to the carton bottom sections 9 and 10. This means preferably comprises additional narrow retaining strips 20 and 21 integrally carried by the respective strips 11 and 12. These retaining strips are defined from strips 11 and 12 by crease lines 22 and 23 and in their operative positions the strips are folded to extend downward, as shown in FIGS. 1 and 3, in which position the edges of the strips may bear against the adjacent edges of the chimes 19 of the cans.

Due to the action of the retaining strips the cans, when moved into the cartons through the open ends, will slide inward with their ends engaged substantially flat against the bottom panels 9 and 10. This will avoid any tendency of the can chimes at the opposite or upper ends of the cans to lock edgewise against each other which would cause one of the cans to assume a tilted position.

Die cut holes 25, 25 are preferably formed in the top wall 6 to serve as finger openings whereby the filled carton may be carried.

The cans may be retained within the carton and prevented from endwise movement by means of inwardly foldable tabs 26, 26 and 27, 27 formed respectively in the upper and lower walls of the carton. These tabs when folded inwardly tend to move against the can ends due to the resiliency of the foldable paperboard and the edges of the tabs will engage edgewise against the inner portions of the can chimes thus preventing the cans from movement outwardly of the carton. Since there is no connection between the median portion of the top wall and the bottom wall, the top wall will tend to flex upwardly when the carton is carried by the carrying means. The resiliently hinged tabs, however, will swing downwardly away from the normal plane of the top wall and thus tend to remain in retaining relation with the can chimes.

From the foregoing it is apparent that the present invention provides an effective open end can carton formed of a relatively small amount of paperboard, whereby it can be inexpensively produced. Due to the center partition strip having the downwardly projecting retaining strips the cans are guided to move accurately into the carton with the chimes of cans in adjacent rows maintained in side by side relation without likelihood of the chimes at the upper ends riding one upon the other.

It may be noted that while the retaining strips for engagement with the chimes have been described as located on the bottom wall, this has been merely for convenience of description as it is broadly immaterial n practice which of the can end engaging walls is considered the top and which is considered the bottom.

Figure 5:
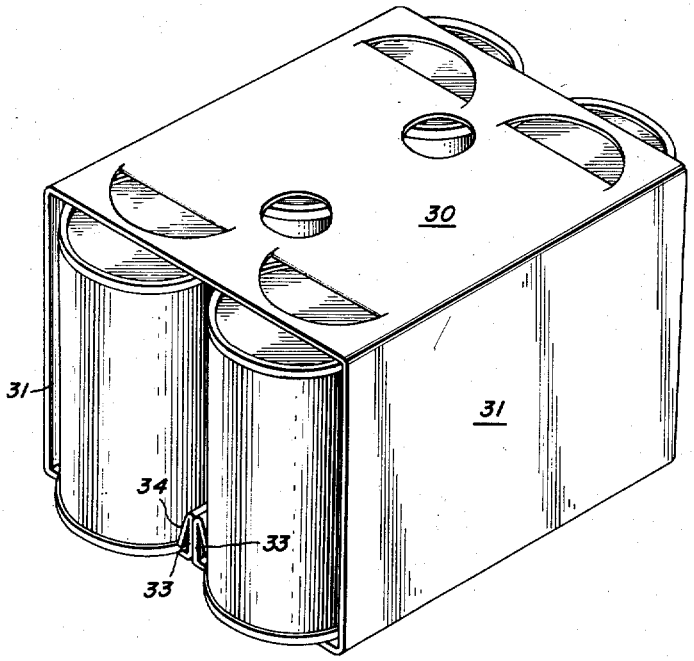
FIGS. 5 and 6 illustrate a perspective view and plan view respectively of a carton and carton blank, similar to FIGS. 1 and 4, except that the carton is intended to be formed around the cans.
Figure 6:
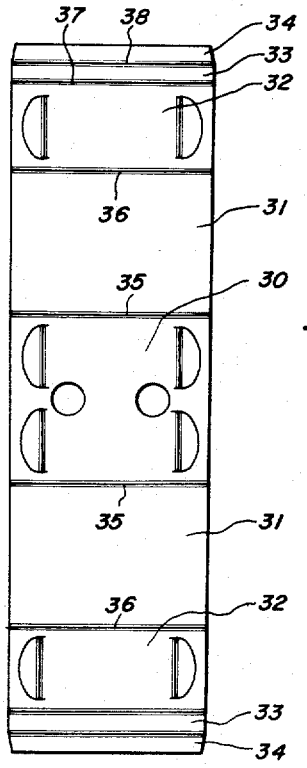

In the modified form of the invention shown in FIGS. 5 and 6, the construction is substantially the same as in he first described form except that the carton is delivered o the packer in the form of flat unglued blanks which are wrapped around a group of two rows of cans. The op panel of the carton also is preferably not formed vith a central crease line.

As shown in FIGS. 5 and 6, the top panel 30 is integrally oined to the two side panels 31, 31, which in turn are ntegrally joined to bottom panels 32, 32. On the outer edges of these latter panels are attaching strips 33, 33 which project upwardly between the can rows. The trips 33, 33 carry retaining strips 34, 34 which engage lownwardly against the lower can chimes. Crease lines 35, 36, 37 and 38 are impressed transversely of the blank o separate the adjacent walls and strips from each other and permit relative folding therebetween.

In this form of the invention a convenient procedure for enclosing cans with the carton blank is to place two ows of cans upon the top panel; then fold upwardly the ide walls; then fold the strip 33 and the attached reaining strip 34 one against the other and move them to generally right angular position with respect to their ttached bottom wall sections 32, 32. Adhesive is applied to one of the strips 33.

The bottom wall sections are folded over against the ans and at the same time the folded strips are brought nto place between the can rows, thus bringing the carton parts into the relationship shown in FIG. 5. The trips 33, 33 are held together until the adhesive has set. This may be done by applying pressure laterally against he side walls 31, 31. The package of two rows of cans hus formed is then substantially the same as the package shown in FIG. 1. The strips 34, 34 by bearing downward upon the edges of the can chimes, hold the cans in place against the bottom wall panels 32 and tend to prevent locking of the chimes one over the other at the other ends of the cans.

While the present description sets forth a preferred embodiment of the invention, various changes may be nade in the construction without departing from the pirit of the invention, and it is therefore desired that the present embodiment be considered in all respects as llustrative and not restrictive, reference being had to the appended claims rather than to the foregoing description o indicate the scope of the invention.

I claim:

1. An open end, rectangular, sleeve-type carton formed of flexible, folding paperboard and adapted to enclose wo rows of closed, chimed cans in side-by-side relation, aid carton having a top wall panel, side wall panels oined to opposite edges of the top wall, a bottom wall panel section connected to the lower end of each side wall, the free edges of the bottom wall panels meeting centrally of the bottom, each of such panel free edges having connected thereto an upwardly projected strip, the upper edge of each of the strips carrying an integral, lownwardly and outwardly folded strip having a width ess than the upwardly projecting strip, whereby the lower edge of each downwardly projecting strip provides a lownwardly presented abutment spaced from the adacent bottom panel, the upwardly and downwardly proecting strips being of such length as to extend substanially the distance between the carton open ends, means ocated centrally of the top wall and aligned with the axis through the open ends of the carton for carrying the carton, there being no supporting connection between he median portion of the top wall and the bottom, whereby the top wall is subjected to flexing when the carton is suspended by the carrying means, inwardly foldable, chime-engaging tabs formed within the contour of the top wall and adapted to be folded through 180° to their chime-engaging position, such tabs being adapted due to the resilience of the paperboard, to swing inwardly away from the normal plane of the top wall and remain in chime-engaging condition as the median portion of the top wall flexes upwardly when the carton is carried by the carrying means.

2. A package comprising a group of two juxtaposed, parallel rows of closed, chimed cans held upright within a rectangular, open-end carton formed of flexible, folding paperboard, such carton including a top wall panel enclosing the upper end of the can group side walls enclosing the sides of the can group, each side wall carrying at its lower end a bottom wall section enclosing the bottoms of one row of cans, the free edges of the bottom sections meeting centrally along the line between the can rows and each edge having connected thereto an upwardly projecting strip disposed between the can rows, such strips being secured flatwise against each other and each strip carrying an integral, downwardly projecting strip of less width than the upwardly projecting strips, such downwardly projecting strips being folded on the outer sides of their attached strips and in contacting relation with the can sides, soch strips extending the length of the carton between its open ends with the bottom edge portions of each of the downwardly folded strips presented respectively in abutting relation to the upper surfaces of the can chimes on the lower ends of the cans of the two can rows to hold the cans against their bottom wall sections.

3. A package as defined in claim 2, including means located centrally of the top panel in line with the meeting surfaces of the can rows for carrying the package, there being no supporting connection between the median portion of the top wall panel and the bottom, whereby the top wall panel is subjected to flexing upward partially away from the tops of the cans when the package is suspended by the carrying means, inwardly foldable chime-engaging tabs formed within the contour of the top wall panel adjacent the end cans in the rows, such tabs being folded through 180° to their chime-engaging position and being urged, due to the resilience of the paperboard, to swing inwardly away from the normal plane of the top wall panel, whereby such tabs tend to remain in engagement with the can chimes as the median portion of the top wall is flexed upward when the package is carried by the carrying means.

4. An open end, rectangular, sleeve-type carton formed of flexible, folding paperboard and adapted to enclose two rows of closed, chimed cans in side-by-side relation, said carton having a top wall panel, side wall panels joined to opposite edges of the top wall panel, a bottom wall panel section connected to the lower end of each side wall panel, the free edges of the bottom wall panels meeting centrally of the carton, each of such panel free edges having connected thereto an upwardly projected strip, the upper edge of each of the strips carrying an integral, downwardly and outwardly folded strip having a width less than the upwardly projecting strip, whereby the lower edge of each downwardly projecting strip provides a downwardly presented abutment spaced from the adjacent bottom panel for engagement with chimes presented by said cans to prevent vertical movement of the cans relative to the bottom wall panel sections of the cartons, the upwardly and downwardly projecting strips being of such length as to extend substantially the distance between the carton open ends, and means integral with the carton engageable with the cans for preventing them from accidentally moving longitudinally of the carton out of an end of the carton.

*5. An open and generally rectangular sleeve-type carton, formed of flexible, foldable paperboard, adapted to enclose two parallel, opposing rows of closed, chimed cans in side-by-side relation, said carton comprising: spaced parallel top and bottom walls interconnected by spaced side walls hingedly connected at their upper and lower edges to opposite edges of said parallel walls on parallel*

*carton hinge lines; at least one of said parallel walls having hingedly attached thereto, along a fold line lying in the plane of said one parallel wall centrally thereof and substantially parallel to said hinge lines, a first strip adapted to be folded, on said fold line, so as to extend into the carton between the ends of a pair of adjacent cans of opposing rows; said first strip having hingedly attached thereto, on a second fold line spaced from said first fold line a predetermined distance, a second strip adapted to be folded outwardly toward said one parallel wall in generally parallel relationship with said first strip, said second strip having a free outer edge extending generally parallel to and spaced from said second fold line a distance slightly less than the distance between said first and second fold lines so that when said second strip is folded into parallel relation with said first strip the free outer edge of said second strip is adapted for engagement with a portion of the chime of an adjacent can to thereby limit vertical movement of said adjacent can relative to said one parallel wall.*

*6. An open end generally rectangular, sleeve-type carton, formed of flexible, foldable paperboard, adapted to enclose two parallel, opposing rows of closed, chimed cans in side-by-side relation, said carton comprising: spaced parallel top and bottom walls interconnected by spaced side walls hingedly connected at their upper and lower edges to opposite edges of said parallel walls on parallel carton hinge lines; at least one of said parallel walls having hingedly attached thereto, along a fold line lying in the plane of said one parallel wall centrally thereof and substantially parallel to said hinge lines, a first*

*strip adapted to be folded, on said fold line, so as to extend into the carton between the ends of a pair of adjacent cans of opposing rows; said first strip having hingedly attached thereto, on a second fold line spaced from said first fold line a predetermined distance, a second strip adapted to be folded outwardly toward said one parallel wall in generally parallel relationship with said first strip, said second strip having a free outer edge extending generally parallel to and spaced from said second fold line a distance slightly less than the distance between said first and second fold lines so that when said second strip is folded into parallel relation with said first strip the free outer edge of said second strip is adapted for engagement with a portion of the chime of an adjacent can to thereby limit vertical movement of said adjacent can relative to said one parallel wall; and means integral with the carton engageable with certain of the cans for preventing the cans from accidentally moving longitudinally out of an end of the carton.*

References Cited in the file of this patent or the original patent

UNITED STATES PATENTS

| | | |
|---|---|---|
| Re. 24,333 | Poupitch | June 25, 1957 |
| 2,331,038 | Meller | Oct. 5, 1943 |
| 2,554,190 | Hennessey | May 22, 1951 |
| 2,680,040 | Griskov et al. | June 1, 1954 |
| 2,727,674 | Rous | Oct. 2, 1956 |
| 2,765,073 | Murray | Oct. 2, 1956 |
| 2,818,171 | Andre | Dec. 31, 1957 |
| 2,912,103 | Hennessey et al. | Nov. 10, 1959 |